United States Patent
Okawa

(10) Patent No.: US 11,905,657 B2
(45) Date of Patent: Feb. 20, 2024

(54) METHOD FOR PRODUCING CELLULOSE NANOFIBERS

(71) Applicant: DAIO PAPER CORPORATION, Shikokuchuo (JP)

(72) Inventor: Junya Okawa, Shikokuchuo (JP)

(73) Assignee: DAIO PAPER CORPORATION, Shikokuchuo (JP)

(*) Notice: Subject to any disclaimer, the term of this patent is extended or adjusted under 35 U.S.C. 154(b) by 812 days.

(21) Appl. No.: 16/978,967

(22) PCT Filed: Mar. 18, 2019

(86) PCT No.: PCT/JP2019/011135
§ 371 (c)(1),
(2) Date: Sep. 8, 2020

(87) PCT Pub. No.: WO2019/181838
PCT Pub. Date: Sep. 26, 2019

(65) Prior Publication Data
US 2020/0407912 A1   Dec. 31, 2020

(30) Foreign Application Priority Data

Mar. 20, 2018 (JP) .................. 2018-052875

(51) Int. Cl.
*D21D 1/20* (2006.01)
*C08B 1/00* (2006.01)
(Continued)

(52) U.S. Cl.
CPC .............. *D21D 1/20* (2013.01); *C08B 1/00* (2013.01); *D01F 2/00* (2013.01); *D21H 11/18* (2013.01)

(58) Field of Classification Search
CPC ...................................................... D21D 1/20
See application file for complete search history.

(56) References Cited

U.S. PATENT DOCUMENTS

2005/0236121 A1    10/2005  Kondo et al.
2008/0057307 A1*    3/2008  Koslow ............... D21D 1/20
                                                  428/364
(Continued)

FOREIGN PATENT DOCUMENTS

JP       2005-270891 A    10/2005
JP       2008-1728 A       1/2008
(Continued)

OTHER PUBLICATIONS

Extended (Supplementary) European Search Report dated Nov. 8, 2021, issued in counterpart EP Application No. 19771924.8. (6 pages).

(Continued)

*Primary Examiner* — Faye Francis
(74) *Attorney, Agent, or Firm* — WHDA, LLP

(57) ABSTRACT

Provided is a method for producing cellulose nanofibers by refining pulp fibers, wherein the method enables obtaining cellulose nanofibers in which a decrease in a molecular weight of cellulose is suppressed, and which can demonstrate superior strength and the like. The present invention is a method for producing cellulose nanofibers, the method including: pretreating pulp fibers in a slurry; and refining, using a high-pressure homogenizer, the pulp fibers in the slurry, the pulp fibers being pretreated, wherein a weight average molecular weight of cellulose of cellulose nanofibers obtained through the refining is 65% or more of a weight average molecular weight of cellulose of the pulp fibers before the pretreating.

2 Claims, 1 Drawing Sheet

(51) Int. Cl.
  *D01F 2/00*   (2006.01)
  *D21H 11/18*  (2006.01)

(56) References Cited

U.S. PATENT DOCUMENTS

2010/0233481 A1    9/2010  Isogai et al.
2015/0337493 A1*  11/2015  Heiskanen ............... C08L 1/04
                                                    162/157.6

FOREIGN PATENT DOCUMENTS

| JP | 2010-235679 A | 10/2010 |
| JP | 2017-8472 A   | 1/2017  |
| JP | 2017-95831 A  | 6/2017  |
| JP | 2018-3216 A   | 1/2018  |
| JP | 2018-048235 A | 3/2018  |
| JP | 6310044 B1    | 4/2018  |
| WO | 2007/088974 A1 | 8/2007 |
| WO | 2009/069641 A1 | 6/2009 |
| WO | 2011/068023 A1 | 6/2011 |
| WO | 2013/188657 A1 | 12/2013 |
| WO | 2017-057710 A1 | 4/2017 |
| WO | 2017/192476 A1 | 11/2017 |
| WO | 2018/037646 A1 | 3/2018 |

OTHER PUBLICATIONS

International Search Report dated Jun. 4, 2019, issued in counterpart International Application No. PCT/JP2019/011135. (2 pages).
Office Action dated Jan. 25, 2022, issued in counterpart JP Application No. 2018-052875, with English translation provided from the JPO One Portal Dossier. (12 pages).

* cited by examiner

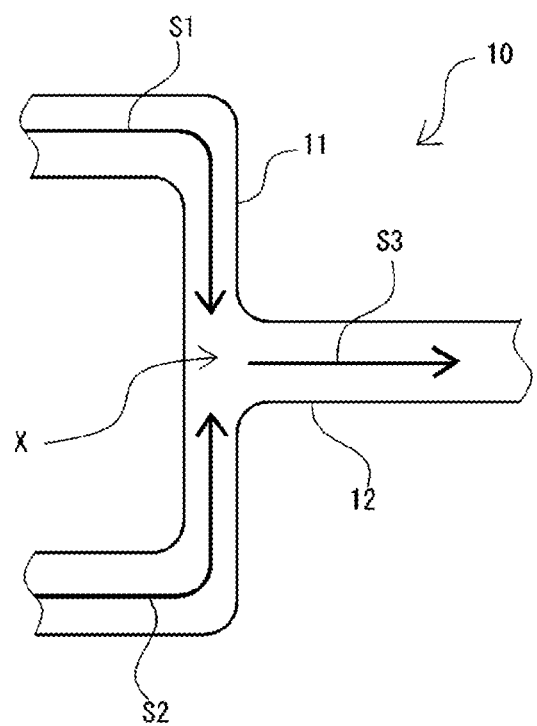

METHOD FOR PRODUCING CELLULOSE NANOFIBERS

TECHNICAL FIELD

The present invention relates to a method for producing cellulose nanofibers.

BACKGROUND ART

In recent years, attention has been attracted to nanotechnology for obtaining new physical properties that are different from conventionally known properties of a substance by refining the substance to the order of nanometers. Cellulose nanofibers produced from cellulosic raw materials such as pulp fibers and the like are excellent in strength, elasticity, thermal stability, etc., and are therefore used, for example, in industrial applications as a filtration material, a filtration aid, a base of an ion exchanger, a filler for a chromatographic analysis instrument, fillers for compounding a resin and a rubber, etc., and in applications as compounding agents of cosmetics such as a lipstick, a powder cosmetic, an emulsion cosmetic, and the like. Furthermore, since cellulose nanofibers are superior in aqueous dispersibility, cellulose nanofibers are expected to be utilized in many applications such as viscosity-retaining agents for food, cosmetics, paints, etc., an enhancer for dough as a food ingredient, a moisture-retaining agent, a food stabilizer, a low-calorie additive, an emulsion stabilizing agent, and the like.

The cellulose nanofibers can be obtained, for example, by fibrillating pulp fibers through a mechanical treatment. As an example of the mechanical treatment for fibrillation, a method is known in which a high-pressure homogenizer is used to allow slurries containing pulp fibers to collide with each other at high pressure. Patent Document 1 discloses an invention relating to a method for pulverizing a polysaccharide such as cellulose or the like in such a manner that a dispersion of the polysaccharide is ejected from a pair of nozzles at a high pressure of 70 MPa to 250 MPa and jet flows of the dispersion collide with each other. In Examples of Patent Document 1, commercially available powders of chitin, crystalline cellulose, etc. are refined using a high-pressure homogenizer.

Meanwhile, regarding a method for producing cellulose nanofibers, a variety of methods in which chemical pretreatments such as an oxidation treatment, a hydrolysis treatment, an esterification treatment, and the like are performed before mechanically treating pulp fibers have been studied. For example, according to Patent Documents 2 and 3, a method in which pulp is oxidized using 2,2,6,6-tetramethyl-1-piperidine-N-oxy radical (TEMPO) and sodium hypochlorite can effectively save steps in the mechanical treatment in a post process.

PRIOR ART DOCUMENTS

Patent Documents

Patent Document 1: Japanese Unexamined Patent Application, Publication No. 2005-270891
Patent Document 2: Japanese Unexamined Patent Application, Publication No. 2008-1728
Patent Document 3: Japanese Unexamined Patent Application, Publication No. 2010-235679

SUMMARY OF THE INVENTION

Problems to be Solved by the Invention

In this context, in order for cellulose nanofibers to be obtained to have excellent strength and the like, it is preferred that cellulose constituting the cellulose nanofibers has a high molecular weight, i.e., that the molecular weight of the cellulose in a process for producing the cellulose nanofibers decreases as little as possible.

The present invention was made in view of the foregoing circumstances, and an object of the present invention is to provide a method for producing cellulose nanofibers by refining pulp fibers, wherein the method enables obtaining cellulose nanofibers in which a decrease in a molecular weight of cellulose is suppressed, and which can demonstrate superior strength and the like.

Means for Solving the Problems

An aspect of the invention made to solve the foregoing problems is a method for producing cellulose nanofibers, the method including: pretreating pulp fibers in a slurry; and refining, using a high-pressure homogenizer, the pulp fibers in the slurry, the pulp fibers being pretreated, wherein a weight average molecular weight of cellulose of cellulose nanofibers obtained through the refining is 65% or more of a weight average molecular weight of cellulose of the pulp fibers before the pretreating.

The method for producing cellulose nanofibers enables cellulose nanofibers in which a decrease in the molecular weight of cellulose is suppressed to be obtained.

A mode diameter of the cellulose nanofibers in a pseudo-particle size distribution curve is preferably 40 μm or less. The cellulose nanofibers having such a small mode diameter are sufficiently refined and thus can exhibit particularly favorable performance.

As the pretreating, the pulp fibers are preferably coarsely fibrillated, using a refiner apparatus, without being chemically treated. Thus, through the pretreating using the refiner apparatus, shear force is effectively applied to the pulp fibers, making the pulp fibers fluffy and soft and allowing preliminary fibrillation. As a result, more favorable refinement can be performed in the refining in a post process while suppressing a decrease in molecular weight. Furthermore, when a chemical pretreatment such as an oxidation treatment, a hydrolysis treatment, an esterification treatment, or the like is performed on the pulp fibers, refinement thereof is relatively easily enhanced by a homogenizer treatment, and accordingly, a decrease in molecular weight due to the homogenizer treatment appears to be suppressed; however, such a chemical treatment cuts a cellulose chain, and conversely, the molecular weight of cellulose decreases significantly. Therefore, in a case in which no chemical treatment is performed as the pretreating, cellulose nanofibers in which a decrease in the molecular weight of cellulose is further suppressed can be obtained.

A fines content of the pulp fibers which are subjected to the pretreating and are to be subjected to the refining is preferably 50% or more. When the fines content of the pulp fibers in the pretreating is 50% or more, a decrease in the molecular weight of cellulose is further suppressed. Although not clarified, the reason for this is surmised as follows: for example, the fines content of 50% or more brings the pulp fibers into a sufficiently loose state; therefore, in a case of using a high-pressure homogenizer in the refining, collision energy remarkably promotes only fibrillation of the pulp fibers, and cutting of the cellulose chain is suppressed. It is to be noted that as a measure of a fibrillation degree of the pulp fibers subjected to the pretreating, measurement of freeness is conceivable. However, when the pretreating is performed to a certain extent, fibrillation progresses to such an extent that the freeness cannot be measured; therefore, the freeness cannot be used to precisely confirm a range of the fibrillation degree in which a decrease in molecular weight is effectively suppressed.

It is to be noted that "cellulose nanofibers" as referred to herein mean fine cellulose fibers obtained by fibrillating pulp fibers, and generally mean cellulose fibers containing fine cellulose fibers having a nanosized fiber width (1 nm or more and 1,000 nm or less). "Fines content" as referred to herein means a proportion by mass of pulp fibers having a fiber length of 0.2 mm or less and a fiber width of 75 μm or less. The fines content may be measured using "FS5", a fiber analyzer available from Valmet Corporation. The fiber analyzer "FS5" can measure a length and a width of a cellulose fiber at high accuracy by image analysis of diluted cellulose fibers passing through a measurement cell in the fiber analyzer.

Effects of the Invention

According to the present invention, a method for producing cellulose nanofibers by refining pulp fibers can be provided, wherein the method for producing cellulose nanofibers enables cellulose nanofibers in which a decrease in a molecular weight of cellulose is suppressed to be obtained.

BRIEF DESCRIPTION OF THE DRAWINGS

FIG. 1 is a partial schematic view of a counter collision-type high-pressure homogenizer used in a method for producing cellulose nanofibers according to an embodiment of the present invention.

DESCRIPTION OF EMBODIMENTS

Hereinafter, a method for producing cellulose nanofibers according to an embodiment of the present invention will be described in detail with reference to the drawing as appropriate.

Method for Producing Cellulose Nanofibers

The method for producing cellulose nanofibers according to an embodiment of the present invention includes a pretreating step and a refining step in this order.

Pretreating Step

The pretreating step is a step of pretreating pulp fibers in a slurry, i.e., a step of coarsely fibrillating the pulp fibers before refining the pulp fibers using a high-pressure homogenizer. Firstly, the pulp fibers serving as a raw material of the cellulose nanofibers will be described below.

Examples of the pulp fibers include:
chemical pulp such as leaf haft pulp (LKP) (e.g., leaf bleached kraft pulp (LBKP) and leaf unbleached kraft pulp (LUKP)), needle kraft pulp (NKP) (e.g., needle bleached kraft pulp (NBKP) and needle unbleached kraft pulp (NUKP));
mechanical pulp such as stone-ground pulp (SGP), pressure stone-ground pulp (PGW), refiner ground pulp (RGP), chemi-ground pulp (CGP), thermo-ground pulp (TGP), ground pulp (GP), thermo-mechanical pulp (TMP), chemi-thermo-mechanical pulp (CTMP) and bleached thermo-mechanical pulp (BTMP);

waste paper pulp produced from brown waste paper, kraft envelope waste paper, magazine waste paper, newspaper waste paper, flyer waste paper, office waste paper, cardboard waste paper, wood-free waste paper, Kent waste paper, imitation Japanese vellum waste paper, land ticket waste paper (chiken waste paper), ground-wood waste paper, and the like;
deinked pulp (DIP) produced by deinking waste paper pulp; and the like. As long as effects of the present invention are not impaired, one type of pulp may be used alone, or a plurality of types of pulp may be used in combination.

In the method for producing cellulose nanofibers, it is preferred that as a pretreatment in the pretreating step, no chemical treatment is performed on the pulp fibers. Thus, in the method for producing cellulose nanofibers, in a case in which no chemical treatment is performed as the pretreatment, cellulose nanofibers in which a decrease in molecular weight is further suppressed can be obtained. It is to be noted that "chemical treatment" as referred to herein generally means a treatment which intentionally uses a chemical (including a catalyst such as an enzyme or the like) and is accompanied by a chemical reaction, and examples of the chemical treatment include an oxidation treatment, a hydrolysis treatment, an esterification treatment, and the like. It is to be noted that "chemical treatment" does not include a mechanical treatment which is accompanied by a chemical reaction that occurs unintentionally.

Examples of the pretreatment in the pretreating step include mechanical treatments using a so-called viscous beating apparatus such as a Niagara beater and the like and mechanical treatments using a refiner apparatus and the like. Through such a mechanical treatment, the pulp fibers are coarsely fibrillated. Of the mechanical treatments, a treatment using a refiner apparatus is preferred. "Refiner" as referred to herein generally means an apparatus for beating pulp fibers, and a known refiner may be used. Through the pretreatment using the refiner which beats the pulp fibers while narrowing a gap and applying a stress, shear force is effectively applied to the pulp fibers, making the pulp fibers fluffy and soft and allowing preliminary fibrillation. As the refiner, a conical refiner, a double disc refiner (DDR), or a single disc refiner (SDR) is preferred, and an SDR is more preferred, for example, because shear force can be efficiently applied to the pulp fibers to promote the preliminary fibrillation. It is to be noted that the pretreating step using the refiner is preferred also because separation and/or cleaning after the treatment are/is unnecessary.

The lower limit of a pulp fiber concentration in a pulp slurry to be subjected to the pretreating step is preferably 1% by mass, and more preferably 2% by mass. Meanwhile, the upper limit is preferably 8% by mass, and more preferably 6% by mass. When the pulp fiber concentration falls within the above range, the pulp slurry has favorable viscosity; thus, the pulp fibers are efficiently coarsely fibrillated using the refiner.

In the pretreating step, for example, a plurality of refiners may be prepared to continuously process the pulp fibers. Alternatively, the pulp fibers may be processed for a long time period while circulating the slurry in one refiner.

Fines Content

A fines content of the pulp fibers which have been subjected to the pretreating step and are to be subjected to the refining step is preferably 50% or more, more preferably 60% or more, still more preferably 70% or more, even more preferably 80% or more, yet more preferably 90% or more, yet still more preferably more than 90%, and yet even more preferably 93% or more. Furthermore, the upper limit of the fines content is, for example, 99% and may be 97%. When the fines content is 50% or more, sufficiently pretreated (fibrillated) pulp fibers can be obtained, and the pulp fibers can be more efficiently refined in the refining step while suppressing a decrease in a molecular weight of cellulose. Furthermore, when the fines content is 50% or more, in a treatment in the refining step using a high-pressure homogenizer, blockage of a flow path by the pulp fibers can also be reduced. It is to be noted that a fines-content measuring step of measuring the fines content of the pulp fibers may be provided between the pretreating step and the refining step.

The fines content may be controlled by throughput and/or the like in the pretreating step. For example, the fines content may be increased by increasing a treatment time period and a number of treatments using the refiner apparatus, and/or, in the treatment using the refiner apparatus, by narrowing a gap (clearance) between discs (plates) and/or appropriately combining a blade width, a groove width, a blade height, an intersection angle of blades, and a pattern of the discs.

Average Fiber Length

An average fiber length of the pulp fibers which have been subjected to the pretreating step and are to be subjected to the refining step is not particularly limited; the lower limit of the average fiber length is preferably 0.15 mm, more preferably 0.2 mm, and still more preferably 0.25 mm. Meanwhile, the upper limit is preferably 0.5 mm, and more preferably 0.4 mm. When pulp fibers having such a fiber length are subjected to the refining step, energy saving and high efficiency can be achieved in a production process as a whole, increasing productivity of the cellulose nanofibers.

Refining Step

The refining step is a step of refining, using a high-pressure homogenizer, the pulp fibers in the slurry, the pulp fibers having been pretreated. In a preferred embodiment, the slurry containing the pulp fibers which have been subjected to the pretreatment that satisfies the above conditions is used, and the pulp fibers are subjected to the refining step, whereby cellulose nanofibers in which a decrease in molecular weight is suppressed are effectively obtained.

"High-pressure homogenizer" as referred to herein means a homogenizer used as a disperser that discharges a slurry or the like through pores at high pressure; for example, the high-pressure homogenizer is capable of discharging a slurry at a pressure of 10 MPa or more, and preferably 100 or more. By processing the pulp fibers using the high-pressure homogenizer, collision of the pulp fibers, microcavitation, and the like occur, leading to effective fibrillation. Thus, the number of treatments in the refining step can be reduced (the refining step can be shortened), and cellulose nanofibers in which a decrease in molecular weight is suppressed can be effectively produced without applying an excessive stress on a cellulose chain.

The high-pressure homogenizer used in the method for producing cellulose nanofibers is preferably a counter collision-type high-pressure homogenizer (may be also referred to as microfluidizer, wet-type jet mill, etc.). In the counter collision-type high-pressure homogenizer, in light of energy efficiency, an angle formed by slurries that face and collide with each other is preferably within 180°±20°, more preferably within 180°±10°, still more preferably within 180°±5°, even more preferably within 180°±2°, yet more preferably within 180°±1°, and yet still more preferably 180°±0.5°.

Moreover, the high-pressure homogenizer is preferably a counter collision-type high-pressure homogenizer configured such that the slurries face and collide with each other in one straight line. In other words, the angle formed by the slurries that face and collide with each other is most preferably 180°. Specifically, as partly shown in FIG. 1, in a counter collision-type high-pressure homogenizer 10, an upstream flow path 11 is formed such that slurries S1 and S2 to which pressure is applied face and collide with each other at a confluence portion X. The slurries S1 and S2 collide with each other at the confluence portion X, and a slurry S3 obtained by collision flows out through a downstream flow path 12. The downstream flow path 12 is provided perpendicularly to the upstream flow path 11, and the upstream flow path 11 and the downstream flow path 12 form a T-shaped flow path. By using the counter collision-type high-pressure homogenizer 10, in which the slurries face and collide with each other in one straight line, energy supplied from the high-pressure homogenizer can be maximally converted to collision energy, enabling efficient fibrillation of the pulp fibers.

The lower limit of a pulp fiber concentration in a pulp slurry to be subjected to the refining step is preferably 0.5% by mass, and more preferably 1% by mass. Meanwhile, the upper limit is preferably 10% by mass, and more preferably 5% by mass. When the pulp fiber concentration falls within the above range, the pulp slurry has favorable viscosity; thus, the pulp fibers are coarsely fibrillated by the mechanical treatment in an efficient manner using the high-pressure homogenizer. Furthermore, the inventors of the present invention have found that the above concentration range is preferred as a concentration at which at a time of counter collision, both effective fibrillation due to collision of fine fibers and suppression of a decrease in the molecular weight of cellulose can be achieved.

It is to be noted that in the method for producing cellulose nanofibers, the fines content of the pulp fibers to be subjected to the refining step is preferably 50% or more, allowing the pulp fibers to be in a sufficiently loose state. In such a case, it is conceivable that a reduction in the treatment time period and/or the number of treatments using the high-pressure homogenizer also contributes to suppressing a decrease in the molecular weight of cellulose.

In the refining step, a refining treatment may be performed a plurality of times, for example, by circulating the slurry in one high-pressure homogenizer. Alternatively, a plurality of high-pressure homogenizers may be prepared to continuously process the pulp fibers.

The lower limit of a temperature of the pulp slurry in the refining step (a temperature of the slurry of the pulp fibers to be processed using the high-pressure homogenizer) may be, for example, 10° C., and is preferably 25° C., more preferably 30° C., and still more preferably 40° C. Pulp fibers in a slurry having a relatively high temperature are in a state in which fibrillation is particularly likely to occur. Therefore, when the temperature of the slurry to be processed using the high-pressure homogenizer is equal to or more than the lower limit, the refining treatment can be performed such that a decrease in the molecular weight of cellulose is sufficiently suppressed. Meanwhile, the upper limit of the temperature is, for example, 80° C., and may be 70° C.

Other Steps

The cellulose nanofibers obtained through the refining step may be subjected to a modifying step and/or a drying step as needed.

Cellulose Nanofibers

The cellulose nanofibers obtained are sufficiently refined while a decrease in molecular weight is suppressed. A retention rate of a weight average molecular weight of cellulose in the cellulose nanofibers, i.e., a ratio (Mw2/Mw1) of a weight average molecular weight (Mw2) of cellulose of the cellulose nanofibers obtained through the refining step, to a weight average molecular weight (Mw1) of cellulose of the pulp fibers before the pretreating step is 65% or more, and preferably 67% or more. It is to be noted that the upper limit of the ratio (Mw2/Mw1) may be, for example, 80%, 75%, or 70%. It is to be noted that the weight average molecular weight (Mw2) of cellulose of the cellulose nanofibers obtained through the refining step depends on a weight average molecular weight of cellulose in pulp fibers serving as a raw material and is, for example, $1\times10^5$ or more and $10\times10^5$ or less. Furthermore, the weight average molecular weight of cellulose is defined as a value measured by gel penetration chromatography (GPC).

A mode diameter (a particle size at the highest peak) in a pseudo-particle size distribution curve of the cellulose nanofibers measured in a water-dispersed state by a laser diffraction method is preferably 40 μm or less, more preferably 35 μm or less, and still more preferably 30 μm or less. Meanwhile, the lower limit of the mode diameter is, for example, 5 μm, and may be 10 μm or 15 μm. Thus obtained cellulose nanofibers having such a particle size distribution can be sufficiently refined and can exhibit favorable performance. The pseudo-particle size distribution curve preferably has one peak. It is to be noted that "pseudo-particle size distribution curve" as referred to herein means a curve indicating a volume-based particle size distribution measured using a particle size distribution meter (e.g., "LA-960S", a particle size distribution analyzer available from HORIBA, Ltd.).

A water retention value of the cellulose nanofibers is, for example, preferably 300% or more and 500% or less. In a case in which the water retention value is less than the lower limit, the cellulose nanofibers may be insufficiently refined. The water retention value (%) of the cellulose nanofibers is measured in accordance with JAPAN TAPPI No. 26.

In the cellulose nanofibers thus obtained, a decrease in molecular weight is suppressed, enabling the cellulose nanofibers to demonstrate excellent strength and the like and to be widely used in applications such as a filtration material, a filtration aid, a base of an ion exchanger, a filler for a chromatographic analysis instrument, fillers for compounding a resin and a rubber, a cosmetic compounding agent, a viscosity-retaining agent, an enhancer for dough as a food ingredient, a moisture-retaining agent, a food stabilizer, a low-calorie additive, an emulsion stabilizing agent, etc.

EXAMPLES

Hereinafter, the present invention will be described in detail by way of Examples; however, the Examples should not be construed as limiting the present invention.

Evaluation Procedure

Physical properties of an Example and a Comparative Example were measured in accordance with the following evaluation procedure.

Fines Content

A fines content (%) was measured using "FS5", a fiber analyzer available from Valmet Corporation.

Water Retention Value

A water retention value (%) of cellulose nanofibers was measured in accordance with JAPAN TAPPI No. 26: 2000.

Weight Average Molecular Weight

A weight average molecular weight of cellulose was measured by GPC under the following measurement conditions.

GPC Measurement Conditions

Apparatus: HLC-8320GPC (available from Tosoh Corporation)

Column: TSKgel Super AWM-H (6.0 mml. D.×15 cm)×2 (available from Tosoh Corporation)

Detector: RI detector; polarity=(+)

Eluent: DMAc-based solution

Pretreatment of specimen: after a specimen was dissolved, filtration was performed using a PTFE cartridge filter, and a specimen solution was visually observed to confirm that no insoluble matter remained in therein.

Calibration curve: a first-order approximation straight line using a standard pullulan available from Shodex was defined as a calibration curve (a molecular weight to be obtained was a pullulan equivalent).

Concentration: 0.6%

Injected amount: 20 μl

Temperature: ordinary temperature

Pulp Viscosity

A pulp viscosity of cellulose was measured in accordance with JIS-P8215 (1998).

Pseudo-Particle Size Distribution Curve

In accordance with ISO-13320 (2009), a curve indicating a volume-based particle size distribution was measured using a particle size distribution meter ("LA-960S", a particle size distribution analyzer available from Horiba, Ltd.).

Example 1

Pretreating Step

A pulp slurry (pulp type: LBKP) having a concentration of 4% by mass was subjected to a coarse fibrillation treatment using a refiner apparatus (SDR). The treatment was performed 40 times, and a fines content of pulp fibers after the pretreatment was measured to be 93.0% or more.

Refining Step

A pulp concentration of the pulp slurry which had been subjected to the coarse fibrillation treatment was adjusted to 2% by mass, and a refining step was performed thereon. A treatment in the refining step was performed using a counter collision-type high-pressure homogenizer (a wet-type jet mill). The high-pressure homogenizer is configured such that slurries face and collide with each other in one straight line. The pulp slurry during processing had a temperature of approximately 60° C.

A water retention value of the pulp slurry was measured each time the treatment using the high-pressure homogenizer was finished; when the water retention value exceeded 350%, it was determined that sufficiently refined cellulose nanofibers were obtained, and the refining step was ended.

Comparative Example 1

Cellulose nanofibers were obtained in a manner similar to that of Example 1, except that the number of treatments using the refiner apparatus was 15 and the pulp fibers after the pretreatment had a fines content of 43.6%.

Evaluation

Weight Average Molecular Weight Retention Rate

In each of Example 1 and Comparative Example 1, a weight average molecular weight (Mw1) of cellulose of the pulp fibers before the pretreating step and a weight average molecular weight (Mw2) of cellulose of the cellulose nanofibers obtained through the refining step were each measured to calculate a retention rate (%; Mw2/Mw1) of the weight average molecular weight of cellulose. Measurement results are shown in Table 1.

Mode Diameter in Particle Size Distribution

Regarding Example 1 and Comparative Example 1, volume-based particle size distributions of the cellulose nanofibers obtained were measured, and pseudo-particle size distribution curves were obtained. Each of the curves indicated a particle size distribution having one peak. Mode diameters in the pseudo-particle size distribution curves are shown in Table 1.

TABLE 1

| | Production conditions | | Evaluation | |
|---|---|---|---|---|
| | Chemical treatment | Fines content before refining step (%) | Weight average molecular weight retention rate (%) | Mode diameter in particle size distribution (μm) |
| Example 1 | None | 93.0 or more | 67.6 | 28.8 |
| Comparative Example 1 | None | 43.6 | 64.3 | 47.8 |

Table 1 indicates that the cellulose nanofibers obtained in Example 1 have a high retention rate of the weight average molecular weight, i.e., a low rate of decrease of the weight average molecular weight. In contrast, the retention rate of the weight average molecular weight in Comparative Example 1 is low.

INDUSTRIAL APPLICABILITY

The method for producing cellulose nanofibers of the present invention enables cellulose nanofibers in which a decrease in molecular weight is suppressed to be obtained. Such cellulose nanofibers in which a decrease in molecular weight is suppressed have excellent mechanical strength and the like, and can be utilized as a variety of additives, fillers, molding materials, etc.

EXPLANATION OF THE REFERENCE SYMBOLS

10: counter collision-type high-pressure homogenizer
11: upstream flow path
12: downstream flow path
S1, S2, S3: slurry
X: confluence portion

The invention claimed is:

1. A method for producing cellulose nanofibers, the method comprising:
   pretreating pulp fibers in a slurry; and
   refining, using a high-pressure homogenizer, the pulp fibers in the slurry, the pulp fibers being pretreated,
   wherein
   as the pretreating, the pulp fibers are coarsely fibrillated, using a refiner apparatus, without being chemically treated,
   a fines content of the pulp fibers which are subjected to the pretreating and are to be subjected to the refining is 50% or more, and
   a weight average molecular weight of cellulose of cellulose nanofibers obtained through the refining is 65% or more of a weight average molecular weight of cellulose of the pulp fibers before the pretreating.

2. The method for producing cellulose nanofibers according to claim 1, wherein a mode diameter of the cellulose nanofibers in a pseudo-particle size distribution curve is 40 μm or less.

* * * * *